UNITED STATES PATENT OFFICE.

RICHARD KIRCHHOFF, JENS DEDICHEN, AND WERNER LANGE, OF BERLIN, GERMANY, ASSIGNORS TO ACTIEN GESELLSCHAFT FÜR ANILIN FABRIKATION, OF BERLIN, GERMANY.

ORTHO-OXY-MONOAZO DYES.

1,219,954.  Specification of Letters Patent.  Patented Mar. 20, 1917.

No Drawing.   Application filed November 27, 1915.  Serial No. 63,822.

*To all whom it may concern:*

Be it known that we, RICHARD KIRCHHOFF, JENS DEDICHEN, and WERNER LANGE, citizens of the first-named Germany, the second-named Norway, and the third-named Germany, residing at Berlin-Lichterfelde-Ost, Germany; Berlin-Halensee, Germany, and Berlin-Friedenau, Germany, respectively, (our post-office addresses being Grabenstrasse 30, Berlin-Lichterfelde-Ost, Germany, Seesenerstrasse 25, Berlin-Halensee, Germany, and Feurigstrasse 10, Berlin-Friedenau, Germany, respectively,) have invented certain new and useful Improvements in Ortho-Oxy-Monoazo Dyes, of which the following is a specification.

The objects of this invention are new azo dyes deriving from picramic acid and a 4-acidylaminophenol. They furnish on wool with aid of chromium mordants olive tints of an excellent fastness to washing, to milling, to potting and to light.

The dyes are in the shape of pulverized dry sodium salts dark powders, soluble in hot water with an orange coloration, becoming more reddish by addition of soda lye. From the solution the dyes are precipitated in the form of yellowish flocks by an acid. Concentrated sulfuric acid dissolves the dyes to orange solutions. The dyes are destroyed by strong reducing agents yielding 2.4.6-triaminophenol and a 4-acidylamino-2-aminophenol.

In order to illustrate how the dyes may be manufactured the following example is given the parts being by weight:

The diazo-compound made from 19.9 parts of picramic acid in the usual way is mixed at 10° C. with a solution of 15.1 parts of 4-acetylaminophenol, alkaline by sodium carbonate. When the combination is complete the mass is warmed at 60° C., drained and dried. The constitution of the dye in the free state is expressed by the formula:

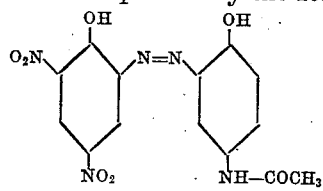

For the process indicated other 4-acidyl-aminophenols can be used such as the derivatives substituted in the nucleus, for instance by halogen or alkyl. Instead of the acetylaminophenols other acidyl derivatives may serve as starting material, for example the corresponding formyl- or benzoyl-compounds.

Having now described our invention and the manner in which it may be performed what we claim is—

1. The herein-described monoazo dyes deriving from diazotized picramic acid and a 4-acidylaminophenol, being in the shape of pulverized dry sodium salts dark powders soluble in hot water with an orange color becoming more reddish by addition of soda-lye, the dye being precipitated as yellowish flocks by an acid; soluble in concentrated sulfuric acid with an orange color; being destroyed by strong reducing agents yielding 2.4.6-triaminophenol and a 4-acidyl-amino-2-aminophenol.

2. The herein-described monoazo dye deriving from diazotized picramic acid and 4-acetylaminophenol, in the free state corresponding to the formula:

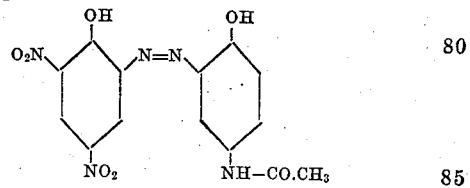

in the shape of pulverized dry sodium salt being a blackish powder, soluble in hot water with an orange color, becoming more reddish by addition of soda lye, the dye being precipitated as yellowish flocks on the addition of an acid; soluble in concentrated sulfuric acid with an orange color; being destroyed by strong reducing agents yielding 2.4.6-triaminophenol and 4-acetylamino-2-aminophenol.

In testimony whereof we affix our signatures in presence of two witnesses.

RICHARD KIRCHHOFF.
JENS DEDICHEN.
WERNER LANGE.

Witnesses:
HENRY HASPER,
CILLI FRANK.